Feb. 23, 1960  N. D. STURGES  2,926,211
NON-SPRAYING BATTERY VENT
Filed June 16, 1959

INVENTOR.
NORMAN D. STURGES
BY
Pennie, Edmonds, Morton, Barrows & Taylor
ATTORNEYS

United States Patent Office 2,926,211
Patented Feb. 23, 1960

2,926,211

NON-SPRAYING BATTERY VENT

Norman D. Sturges, New York, N.Y.

Application June 16, 1959, Serial No. 820,739

7 Claims. (Cl. 136—177)

This invention relates to storage batteries of non-spillable type having a vent tube projecting downwardly within a substantially enclosed casing to a position above the normal mean level of the electrolyte. More particularly, the invention relates to the combination, in a storage battery cell of this type, of a novel interior shield with a vent tube or a vent-filler tube which permits gases to escape from the casing through the tube, but which prevents the electrolyte or vapors thereof from exiting from the casing through the tube even when the battery is being charged.

A vent-filler tube is a removable open-ended plug provided in the top of a storage battery cell to permit the electrolyte (usually sulfuric acid diluted with distilled water) to be introduced into the interior thereof and to permit the escape of gases which generate at the electrode plates. In storage batteries of the non-spillable type, the vent-filler tube projects into an otherwise sealed casing to a point above the normal mean level of the electrolyte. The lower open end of the tube is so located with respect to the liquid level that the electrolyte cannot normally flow out through the tube regardless of the position of the battery.

Even with such vent-filler tubes, however, it is still possible that the electrolyte might splash or otherwise enter into the lower open end of the tube, particularly if the battery is violently shaken. It is common practice, therefore, to provide some form of vent-filler shield to surround the length of the tube within the casing. One of the more effective types of vent-filler shields includes a sleeve disposed about the tube, the lower end of which is closed opposite the open end of the vent-filler tube and spaced beneath the lower end of the tube. Openings are provided in such a shield at its upper and lower ends to permit introduced liquids and escaping gases to pass into and out of the sleeve.

Conventional vent-filler shields of this type are not entirely satisfactory, however, for all purposes. For example, when a storage battery is being charged, the gases (particularly hydrogen) which generate at the battery plates bubble up through the electrolyte to produce an effect known as "gassing." When this occurs, the electrolyte foams and expands considerably, and often rises to submerge the lower end of the sleeve or other shield. Consequently, the electrolyte enters the sleeve through its lowermost openings and sometimes spurts out of the casing through the tube.

Moreover, with conventional vent-filler shields, the gases escaping through the tube under normal operating conditions tend to carry with them a certain amount of acid vapor from the electrolyte. This occurs because the relatively light gases rise into the tube directly through lower openings in the sleeve rather than through the upper openings. Thus, the path taken by the escaping gases is relatively short and there is little opportunity for the vapor carried thereby to condense onto the interior walls of the casing. As a result, some acidic vapor escapes from the casing and can cause serious damage by corrosion to surrounding apparatus.

It is the broad purpose of the present invention to overcome these disadvantages characteristic of conventional shields. Thus, it is an object of the new shield to permit escape of gas and to prevent entrance of electrolyte into the sleeve through the lower openings thereof even when its lower end portion is submerged by the electrolyte. At lower electrolyte levels, however, the shield of the invention is adapted to permit the electrolyte which enters the sleeve through its upper openings to drain out of the lower end of the sleeve. Also, when gas bubbles rise through the electrolyte, the vent-filler shield of the invention deflects them away from its lower openings. The gas is therefore forced to take the longer path to the tube through the upper openings and virtually all acid vapor carried by them condenses out before reaching the tube. Consequently, no electrolyte liquid or vapor is emitted from the battery during charging or normal operation.

In accordance with the invention, an interior vent-filler shield is combined with an open-ended vent-filler tube projecting downwardly through the top of the storage battery cell casing and terminating below the lower end of the tube. At its upper end portion, the sleeve is partly open. At its lower end, the sleeve is closed off but for at least one restricted sidewardly extending passage. This passage is sufficiently restricted to prevent entrance of electrolyte therethrough into the lower end of the sleeve even when the passage is submerged by the electrolyte. Immediately adjacent and beneath the passage, a lip portion extends laterally outwardly from the lower end of the sleeve. Thus, the lip portion deflects rising gas bubbles away from the passage and promotes uni-directional drainage through the passage of electrolyte collected in the sleeve, as below explained.

The advantages of the invention are made clear in the following description of two embodiments of the invention, with reference to the accompanying drawing, wherein Fig. 1 is a fragmentary vertical section of the upper portion of a storage battery cell equipped with one embodiment of the new vent-filler shield;

Figure 1:
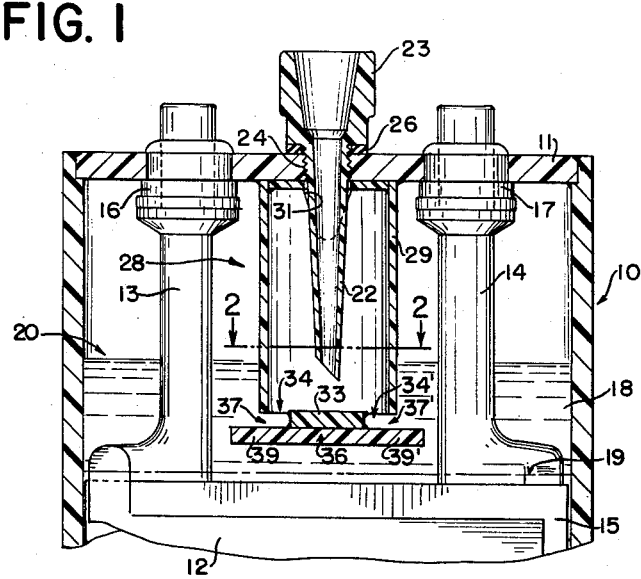

Referring first to Fig. 1, a storage battery cell is shown which includes a casing 10 sealed at the top by a flat cover 11. Various materials may be used to form the casing and cover, provided they possess suitable physical resistance to chemical attack by the electrolyte of the battery. A transparent plastic material such as polymethylmethacrylate is particularly suited for this purpose because it is strong, it permit the interior of the battery to be observed through the walls of the casing and it is unaffected by sulfuric acid. A plurality of positive and negative electrode plates 12 are suspended within the casing 10 from respective positive and negative terminal posts 13 and 14. Separators 15 are disposed between adjacent pairs of the electrode plates 12 in conventional manner. The terminal posts 13 and 14 extend upwardly through corresponding apertures in the cover 11 and are sealed with rubber grommets 16 and 17 respectively, in the manner described in my copending application by U.S. Letters Patent, Ser. No. 746,159, filed July 2, 1958.

The casing 10 contains a sufficient amount of an electrolyte 18 (such as dilute sulfuric acid) to submerge the electrode plates 12. Normally, the mean level of the electrolyte 18 is about where indicated by the broken line 19. The level of the electrolyte 18 tends to drop from this normal mean level 19 as the battery discharges or stands idle. As is well known, it should always cover the plates.

When the battery is being charged, the level of the electrolyte 18 rises considerably above the level 19 as, for example, up to the level 20 shown in solid lines. Such a variation in the volume of the electrolyte 18 during charging is caused, at least in part, from a change in its specific gravity and from the "gassing" phenomenon which occurs at the electrode plates 12. Gas bubbles (particularly hydrogen) form so rapidly at the electrode plates that they cause considerable agitation as they rise through the electrolyte to the free space within the casing. Thus, the top layer of the electrolyte 18 foams and expands upwardly to approximately the level 20.

As mentioned previously, means must be provided to permit the electrolyte, and occasionally a certain amount of distilled water, to be introduced into the casing 10, and also to permit the generated gases to escape from the casing. Thus, the battery includes a vent-filler tube 22 extending downwardly through an aperture in the cover 11 and terminating within the casing above the normal mean level 19 of the electrolyte. A widened upper portion 23 of the tube 22 is exposed to the atmosphere on the exterior of the battery cell. A portion of the tube 22 adjacent the upper portion 23 is externally threaded at 24 to engage corresponding internal threads in the cover 11. Thus, the vent-filler tube 22 may be removed to permit initial filling with electrolyte or subsequently with water, and then screwed into position in the casing. To prevent leakage through the cover 11 around the vent-filler tube 22, a rubber gasket 26 may be seated about the tube adjacent its upper portion 23.

The lower end of the vent-filler tube 22 is positioned within the casing 10 and the cubic capacity of the casing with respect to the volume of electrolyte is such that the tube cannot be submerged by the electrolyte under normal operating conditions regardless of the position of the cell. However, to prevent the electrolyte from submerging the lower end of the tube 22 when the battery is being charged (i.e., when the electrolyte has risen to level 20) and to prevent the escape of electrolyte or vapors thereof through the tube 22 at any time, the invention provides an interior vent-filler shield indicated generally by the numeral 28.

Included in the shield 28 is a cylindrical sleeve 29 depending from the underside of the cover 11 concentrically with the tube 22 within the casing. Sleeve 29 is faced-off perpendicular to its axis below the lower end of the tube 22 and above the normal mean level 19 of the electrolyte, for example, one-half inch. At the upper end of the sleeve 29 adjacent the cover 11 are formed two diametrically opposed openings 31 (only one of which is visible in the drawing) which communicate the free space within the casing 10 with the interior of the sleeve 29. In the illustrated embodiment these are about ¼ inch long and ¼ inch across the top.

Figure 2:
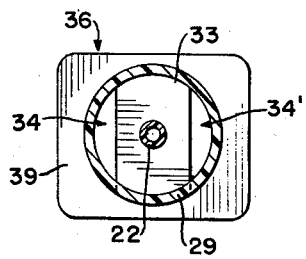
Fig. 2 is a section taken along the line 2—2 of Fig. 1.

As shown in both Figs. 1 and 2, a thin spacer plate 33 is attached to and diametrically spans the faced-off lower end of the sleeve 29. The plate 33 may be, say, 1/16 inch thick and is considerably narrower than the diameter of the sleeve 29 so that two symmetrical chordal openings 34 and 34' are formed, one on each side of the plate. Secured to the underside of the plate 33 is a transverse baffle plate 36 which includes a flat central portion subtending the lower end of the sleeve 29. Thus, the baffle plate 36 forms with the lower edge of the sleeve 29 a pair of narrow, restricted, sidewardly extending passages 37 and 37'. These passages 37 and 37' lead directly inwardly to the respective openings 34 and 34' so that communication between the inside and outside of the sleeve is provided through its lower end.

It will be seen that the passages 37 and 37' are of a width equal to the thickness of the spacer plate 33. According to the invention, this width is such that a capillary seal is formed when the lower end of the sleeve 29 is submerged in the electrolyte 18 (i.e., at the level 20 of the electrolyte), and such as to prevent entrance of the electrolyte into the sleeve through the openings 34 and 34'.

The baffle plate 36 also includes a pair of lip portions 39 and 39' extending laterally outwardly immediately adjacent and beneath the respective passages 37 and 37'. In the embodiment shown in Figs. 1 and 2, the lip portions 39 and 39' extend beyond the sleeve approximately ⅛ inch, and are horizontal and coplanar with the central portion of the baffle plate 36, so that the entire baffle plate is flat. The function of the lip portions 39 and 39' of the baffle plate is discussed below.

The operation of the new vent-filler sleeve 29 may be considered under two conditions (1) the normal operating condition when the electrolyte is at about the mean level 19, and (2) the charging condition when the electrolyte is at about the level 20. Under the first condition, a certain amount of gases (particularly hydrogen) are generated at the electrode plates 12. As the generated gases rise to the surface of the electrolyte (at about the level 19), the pressure within the casing 10 increases and the gases tend to escape through the openings 31 and the vent-filler tube 22. There is also a certain amount of acidic electrolyte vapor in the free space in the casing 10 which forms a visible cloud and tends to settle over the surface of the electrolyte. As the gases rise through this layer of vapor within the casing and proceed toward the tube 22, some of the vapor is carried along with the gases. The lip portions 39 and 39' of the baffle plate 36 serve to deflect the rising gases and vapor away from the passages 37 and 37', so that they are directed to the openings 31 at the upper end of the sleeve 29. They then descend through the sleeve to the lower end of the tube 22 and proceed through the tube out of the casing. In following this relatively tortuous path, virtually all of the electrolyte vapor carried by the gases condenses onto the walls of the sleeve 29, tube 22, and casing 10 so that only the dry gases are emitted from the upper end 23 of the tube. If it were not for the lip portions 39 and 39', the gases would rise directly through the openings 34 and 34' at the lower end of the sleeve 29 and pass into and through the tube 22 before all of the electrolyte vapor carried thereby could condense out.

Also under this first operating condition, it is occasionally necessary to introduce distilled water, or additional electrolyte, into the battery through the vent-filler tube 22. When this is done, the liquid flows through the lower end of the tube 22 onto the upper side of the spacer plate 33. It has been found that when the liquid covers one or both of the openings 34 and 34', it flows with considerable rapidity out of the shield through the passages 37 and 37', notwithstanding the restricted size of the passages. Apparently, the lip portions 39 and 39' of the baffle plate 36 promote drainage through the passages 37 and 37' because they provide expansive surfaces immediately outside of the passages 37 and 37' which tend to be wetted by the liquid in the passages. This overcomes the effect of the capillary seal in the passages 37 and 37' and causes the liquid in the lower end of the sleeve 29 to drain immediately through the passages, but does not encourage liquid flow in the opposite direction. Moreover, quantities of the electrolyte 18 which collect in the sleeve 29 by condensation, or by flowing in through the upper openings 31 when the battery is tilted, are also quickly drained from the lower end of the sleeve in the same manner.

The second operating condition of the battery mentioned above occurs during charging when considerable "gassing" occurs at the electrode plates 12 and the electrolyte 18 rises to about the level 20. Under these conditions, the entire lower end of the shield 28 is submerged. The lip portions 39 and 39' then serve to deflect rising gas bubbles away from the passages 37 and 37' so that they come to the surface of the electrolyte 18 on the outside of the sleeve 29. The gas then proceeds up through the free space and into the upper openings 31, down inside the sleeve 29 to the lower end of the tube 22, and thence up through the tube to the atmosphere. Since no gas bubbles rise to the surface within the lower end of the sleeve 29, the electrolyte vapor again condenses out before reaching the tube 22. The drops of condensed vapor which may accumulate near the bottom of the sleeve will not enter the bottom of the vent tube.

Under these charging conditions, the restricted passages 37 and 37' provide a uni-directional capillary seal which prevents entrance of the electrolyte into the lower end of the sleeve 29. To assure this seal the width of these passages must not be too large. Consequently, the electrolyte 18 will not submerge the lower end of the tube 22 and spurt out of the casing under pressure. Since no acid vapor is discharged, either, the escaping gas is dry. The lip portions 39 and 39', which at lower electrolyte levels promote drainage through the passages 34 and 34', in no way reduce the effectiveness of this capillary seal under these conditions.

Figure 4:
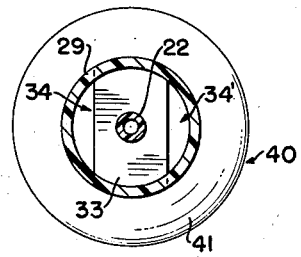
Fig. 4 is a section taken along the line 4—4 of Fig. 3.
Figure 3:
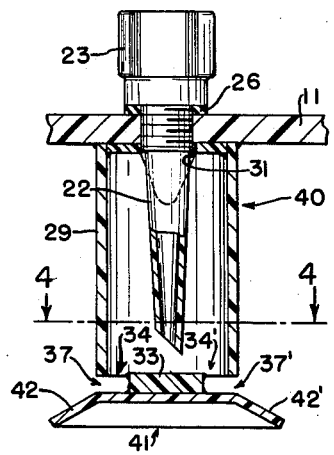
Fig. 3 is a fragmentary vertical section showing another embodiment of the vent-filler shield of the invention.

A modification of the above-described vent-filler shield is shown in Figs. 3 and 4. In this embodiment, a vent-filler tube 22 extends downwardly into a storage battery cell through a cover 11, and the tube 22 is threaded into the cover and sealed by a gasket 26, as before. A shield 40 is provided which includes a cylindrical sleeve 29 depending concentrically about the tube 22 from the underside of the cover 11. The sleeve 29 is faced-off perpendicular to its axis below the lower end of the tube 22 and above the normal mean level of the electrolyte. A spacer plate 33, narrower than the diameter of the sleeve 29, spans the lower end of the sleeve to form chordal openings 34 and 34'. A baffle plate 41 is attached to the underside of the spacer plate 33 to subtend the lower end of the sleeve 29 and form therewith narrow arcuate passages 37 and 37' which lead from openings 34 and 34', respectively.

In this embodiment of the vent-filler shield, the baffle plate 41 has peripheral lip portions 42 and 42' which extend outwardly and downwardly from its central portion. Thus, the baffle plate 41 is of dish-like shape. Under certain conditions, the inclination of the lip portions 42 and 42' may serve to promote more rapid drainage of collected liquid from the lower end of the sleeve 29. In all other respects, the operation of the baffle plate 41 is precisely as described above in reference to the previously described embodiment.

It has been found advantageous to form the vent-filler tube, sleeve, spacer plate, and baffle plate of either embodiment of my invention, of the same transparent acid-resistant plastic as the casing and cover. Various other materials including plastics, glass and hard rubber can also be used. It is important that the width of the restricted opening be proportioned in consonance with the material used so as to achieve the described capillary seal or barrier. The several component parts of the new vent-filler shield can be permanently assembled by any suitable acid-resistant cementing material, or the entire structure can be molded in one piece.

I claim:

1. In a storage battery cell having an open-ended vent tube projecting downwardly through the upper portion of an outer casing and terminating therewithin above the normal mean electrolyte level, an interior vent shield comprising a sleeve disposed about said tube within said casing and terminating below the lower end of said tube, said sleeve being at least partially open at its upper end portion and being closed off at its lower end portion except for at least one restricted passage extending sidewardly therethrough, said passage being sufficiently restricted to prevent entrance of electrolyte therethrough into the lower end of said sleeve even when said passage is submerged by said electrolyte during charging, and a lip portion extending laterally outwardly from the lower end of said sleeve at the lower edge of said passage so that at the normal mean electrolyte level the electrolyte which collects in said shield can exit therefrom through said passage onto said lip portion, whereby said lip portion deflects rising gas bubbles away from said passage and promotes uni-directional drainage of electrolyte from said sleeve through said passage.

2. In a storage battery cell having an open-ended vent tube projecting downwardly through the upper portion of an outer casing and terminating therewithin above the normal mean electrolyte level, an interior vent shield comprising a sleeve disposed about said tube within said casing and terminating below the lower end of said tube, said sleeve being at least partially open at its upper end portion, and a transverse baffle plate subtending and closely spaced from the lower end of said sleeve so as to define therewith at least one restricted passage into the lower end of said sleeve, said passage being sufficiently restricted to prevent entrance of electrolyte therethrough into the lower end of said sleeve even when said passage is submerged by said electrolyte during charging, said baffle plate including a lip portion extending laterally outwardly at the lower edge of said passage so that at the normal mean electrolyte level the electrolyte which collects in said shield can exit therefrom through said passage onto said lip portion, whereby said lip portion deflects gases rising in said electrolyte away from said passage and promotes uni-directional drainage of electrolyte from said sleeve through said passage.

3. In a storage battery cell having an open-ended vent tube projecting downwardly through the upper portion of an outer casing and terminating therewithin above the normal mean electrolyte level, an interior vent shield comprising a sleeve disposed about said tube within said casing, said sleeve being faced-off perpendicular to the axis of said tube below the lower end of said tube, said sleeve being at least partially open at its upper end portion, and a tranverse baffle plate which includes a flat central portion subtending and closely spaced from the lower end of said sleeve so as to define therewith at least one restricted passage into the lower end of said sleeve, said passage being sufficiently restricted to prevent entrance of electrolyte therethrough into the lower end of said sleeve even when said passage is submerged by said electrolyte during charging, said baffle plate also including a lip portion extending laterally outwardly from said central portion at the lower edge of said passage so that at the normal mean electrolyte level the electrolyte which collects in said shield can exit therefrom through said passage onto said lip portion, whereby said lip portion deflects rising gases away from said passage and promotes uni-directional drainage through said passage of electrolyte from said sleeve.

4. In a storage battery cell having a straight open-ended vent tube projecting downwardly through the upper portion of an outer casing and terminating therewithin above the normal mean electrolyte level, an interior vent shield comprising a cylindrical sleeve disposed concentrically about said tube within said casing, said sleeve being faced-off perpendicular to its axis below the lower end of said tube, said sleeve being partially open at its upper end, a thin spacer plate diametrically spanning the faced-off lower end of said sleeve, said spacer plate being considerably narrower than the diameter of said sleeve so that openings into and parallel to the axis of the sleeve are formed on each side of the spacer plate, and a transverse baffle plate including a flat central portion secured to the underside of said spacer plate and subtending the lower end of said sleeve so as to define therewith a pair of narrow restricted passages leading to the respective openings into the lower end of said sleeve, said passages being sufficiently restricted to prevent entrance of electrolyte therethrough into the lower end of said sleeve even when said passages are submerged by said electrolyte during charging, said baffle plate including lip portions extending laterally outwardly from said central portion at the lower edge of the respective passages so that at the normal mean electrolyte level the electrolyte which collects in said shield can exit therefrom through said passages onto said lip portions, whereby said lip portions deflect rising gas bubbles away from said passage and promote uni-directional drainage through said passage of electrolyte collected in said sleeve.

5. A storage battery cell according to claim 4 wherein said lip portions are coplanar with said central portion and extend about the entire periphery of said baffle plate.

6. A storage battery cell according to claim 4 wherein said lip portions are directed laterally outwardly and downwardly from said central portion and extend about the entire periphery of said baffle plate.

7. A storage battery cell according to claim 4 in which the electrolyte comprises dilute sulfuric acid and the width of said restricted passages is approximately $\frac{1}{16}$ inch.

References Cited in the file of this patent

UNITED STATES PATENTS 2,646,459     Gill                    July 21, 1953

FOREIGN PATENTS 464,401     Great Britain           Apr. 12, 1957